United States Patent
Xing et al.

(10) Patent No.: US 10,769,821 B2
(45) Date of Patent: Sep. 8, 2020

(54) METHOD AND DEVICE FOR RECONSTRUCTING CT IMAGE AND STORAGE MEDIUM

(71) Applicants: NUCTECH COMPANY LIMITED, Beijing (CN); Tsinghua University, Beijing (CN)

(72) Inventors: Yuxiang Xing, Beijing (CN); Li Zhang, Beijing (CN); Jianmin Li, Beijing (CN); Zhiqiang Chen, Beijing (CN); Jianping Gu, Beijing (CN)

(73) Assignees: Nutech Company Limited, Beijing (CN); Tsinghua University, Beijing (CN)

( * ) Notice: Subject to any disclaimer, the term of this patent is extended or adjusted under 35 U.S.C. 154(b) by 106 days.

(21) Appl. No.: 16/045,383

(22) Filed: Jul. 25, 2018

(65) Prior Publication Data
US 2019/0035117 A1 Jan. 31, 2019

(30) Foreign Application Priority Data
Jul. 25, 2017 (CN) .......................... 2017 1 0615147

(51) Int. Cl.
*G06T 5/20* (2006.01)
*G06T 11/00* (2006.01)
(Continued)

(52) U.S. Cl.
CPC .............. *G06T 11/006* (2013.01); *G06N 3/04* (2013.01); *G06N 3/0454* (2013.01);
(Continued)

(58) Field of Classification Search
CPC . G06T 2207/20016; G06T 2207/10072; G06T 2211/421; G06T 5/20; G06N 3/0454
See application file for complete search history.

(56) References Cited

U.S. PATENT DOCUMENTS

| 5,526,446 A | 6/1996 | Adelson et al. |
| 9,589,374 B1 | 3/2017 | Gao et al. |

(Continued)

FOREIGN PATENT DOCUMENTS

| JP | 2007-504912 A | 3/2007 |
| JP | 2008-229161 A | 10/2008 |

(Continued)

OTHER PUBLICATIONS

Jin et al.; "Deep Convolutional Neural Network for Inverse Problems in Imaging"; Cornell University Library; Nov. 2016; 20 pages.
(Continued)

*Primary Examiner* — Sam Bhattacharya
(74) *Attorney, Agent, or Firm* — BakerHostetler (57) ABSTRACT

A method and device for reconstructing a CT image and a storage medium are disclosed. CT scanning is performed on an object to be inspected to obtain projection data on a first scale. Projection data on a plurality of other scales is generated from the projection data on the first scale. Projection data on each scale is processed on the corresponding scale by using a first convolutional neural network to obtain processed projection data, and a back-projection operation is performed on the processed projection data to obtain a CT image on the corresponding scale. CT images on the plurality of scales are fused to obtain a reconstructed image of the object to be inspected.

20 Claims, 9 Drawing Sheets

(51) Int. Cl.
  *G06T 5/00*    (2006.01)
  *G06T 3/40*    (2006.01)
  *G06N 3/04*    (2006.01)

(52) U.S. Cl.
  CPC ............ *G06T 3/4046* (2013.01); *G06T 5/002* (2013.01); *G06T 5/20* (2013.01); *G06T 2207/10072* (2013.01); *G06T 2207/20016* (2013.01); *G06T 2207/20084* (2013.01); *G06T 2207/20221* (2013.01); *G06T 2211/421* (2013.01); *G06T 2211/436* (2013.01)

(56) References Cited

U.S. PATENT DOCUMENTS

| | | |
|---|---|---|
| 2005/0185835 A1 | 8/2005 | Matsugu et al. |
| 2015/0278642 A1 | 10/2015 | Chertok et al. |
| 2016/0300121 A1 | 10/2016 | Chertok et al. |
| 2018/0365824 A1 | 12/2018 | Yuh et al. |

FOREIGN PATENT DOCUMENTS

| | | |
|---|---|---|
| JP | 2016-198507 A | 12/2016 |
| WO | WO 2005/024722 A2 | 3/2005 |
| WO | WO 2017/106645 A1 | 6/2017 |

OTHER PUBLICATIONS

Ge, Wang; "A Perspective on Deep Imaging"; IEEE Access; vol. 4; 2016; p. 8914-8924.
European Patent Application No. 18185452.2; Extended Search Report; dated Jan. 24, 2019; 10 pages.

- Sparse-angle scanning
- Limited angle
- Detector under-sampling
- Intra-reconstruction

Fig. 13

METHOD AND DEVICE FOR RECONSTRUCTING CT IMAGE AND STORAGE MEDIUM

CROSS-REFERENCE TO RELATED APPLICATION(S)

This application claims priority to the Chinese Patent Application No. 201710615147.5, filed on Jul. 25, 2017, which is incorporated herein by reference in its entirety.

TECHNICAL FIELD

The embodiments of the present disclosure relate to radiation imaging, and more particularly, to a method and device for reconstructing a CT image and a storage medium.

BACKGROUND

X-ray CT imaging systems have been widely used in fields such as medical treatment, security inspection, industrial non-destructive detection, etc. Ray sources and detectors collect a series of projection data according to a certain trajectory, and a three-dimensional spatial distribution of linear attenuation coefficients of an object to be inspected may be obtained through recovery by using an image reconstruction algorithm. A CT image reconstruction process is to recover a linear attenuation coefficient distribution from data acquired by the detectors, which is a core step of CT imaging. Currently, analytical reconstruction algorithms such as filtered back-projection, Feldkmap-Davis-Kress (FDK), etc. and iterative reconstruction methods such as Algebra Reconstruction Technique (ART), Maximum A Posterior (MAP), etc. are mainly used in practical applications.

With the increasing diversity of demands for X-ray CT imaging, the requirements for reducing a radiation dosage have become higher and higher, and the image quality which can be achieved by the reconstruction methods in the related art has approached the limit. There is a need to develop a new CT image reconstruction technique.

SUMMARY

In order to address one or more problems in the related art, there are provided a method and a device for reconstructing a CT image and a storage medium, which can improve the quality of the reconstructed image.

According to an aspect of the present disclosure, there is provided a method for reconstructing a Computed Tomography (CT) image, comprising: performing CT scanning on an object to be inspected to obtain projection data on a first scale; generating projection data on a plurality of other scales from the projection data on the first scale; processing, on each scale, projection data on the corresponding scale by using a first convolutional neural network to obtain processed projection data, and performing a back-projection operation on the processed projection data to obtain a CT image on the corresponding scale; and fusing CT images on the plurality of scales to obtain a reconstructed image of the object to be inspected.

According to an embodiment of the present disclosure, the CT scanning is one of the following: detector under-sampling scanning, sparse-angle scanning, intra-reconstruction scanning, finite angle scanning, and linear trajectory scanning, and the first convolutional neural network is a pooling layer-free convolutional neural network.

According to an embodiment of the present disclosure, the CT scanning is circular scanning or helical scanning, and the first convolutional neural network further comprises a plurality of pooling layers disposed after respective convolutional layers, and a fully connected layer.

According to an embodiment of the present disclosure, the method further comprises a step of: processing, on each scale, a CT image on the corresponding scale by using a second convolutional neural network.

According to an embodiment of the present disclosure, the method further comprises a step of: before generating the projection data on the plurality of other scales, filtering the projection data by using a ramp filter.

According to an embodiment of the present disclosure, the CT image on each scale is locally smoothed by using the second convolutional neural network.

According to an embodiment of the present disclosure, a convolutional kernel of a convolutional layer in the first convolutional neural network has a dimension of a detector pixel sequence and another dimension of a scanning angle, and a scale of the convolutional kernel of the convolutional layer in the first convolutional neural network on the dimension of the detector pixel sequence is set independently from a scale of the convolutional kernel of the convolutional layer in the first convolutional neural network on the dimension of the scanning angle.

According to an embodiment of the present disclosure, the first convolutional neural network comprises at least three convolutional layers, each of which has an activation function for performing a non-linear operation on projection data processed by the convolutional layer.

According to an embodiment of the present disclosure, the first convolutional neural network further comprises a back-projection layer for performing a back-projection operation on projection data processed by the convolutional layer.

According to an embodiment of the present disclosure, a length-width size parameter of a convolutional kernel of a convolutional layer in the first convolutional neural network which is closest to the back-projection layer is 1*1.

According to an embodiment of the present disclosure, the second convolutional neural network comprises an image domain initial convolutional layer and an end convolutional layer for processing the reconstructed image in an image domain.

According to an embodiment of the present disclosure, each convolutional layer included in the image domain initial convolutional layer has an activation function, and the end convolutional layer has no activation function.

According to an embodiment of the present disclosure, different convolutional kernels are convolved with the projection data on the first scale respectively to obtain the projection data on the plurality of other scales.

According to an embodiment of the present disclosure, pooling is performed on different scales on the projection data on the plurality of other scales to obtain projection data on the plurality of different scales.

According to an embodiment of the present disclosure, the step of fusing CT images on the plurality of scales comprises fusing the CT images on the plurality of scales progressively by an up-sampling operation, to finally obtain the reconstructed image of the object to be inspected.

According to an embodiment of the present disclosure, the step of fusing the CT images on the plurality of scales comprises fusing the CT images from the smallest scale to the largest scale progressively, wherein a process of fusion in each level comprises: in a case where a second scale is the smallest scale, performing an up-sampling operation on a CT image on the second scale to obtain a CT image on the first scale which is relatively larger, or in a case where the second scale is not the smallest scale, performing the up-sampling operation on a fused image on the second scale which is relatively smaller to obtain a CT image on the first scale which is relatively larger; and convolving an integral image formed of the reconstructed CT image on the first scale and the CT image obtained after the up-scaling operation with a particular convolutional kernel to obtain a fused image on the first scale.

According to an embodiment of the present disclosure, the method further comprises: outputting a fused image on the largest scale as a final CT image.

According to an embodiment of the present disclosure, the step of fusing CT images on the plurality of scales comprises: converting CT images on scales other than the largest scale into images on the largest scale by an up-sampling operation; and processing the CT image on the largest scale and the converted images on the largest scale as a whole by using a convolutional kernel to obtain a fused image.

According to another aspect of the present disclosure, there is provided a device for reconstructing a Computed Tomography (CT) image, comprising: a CT scanning apparatus configured to perform CT scanning on an object to be inspected to obtain projection data; a processor configured to: generate projection data on a plurality of other scales from the projection data on the first scale; process, on each scale, projection data on the corresponding scale by using a first convolutional neural network to obtain processed projection data, and perform a back-projection operation on the processed projection data to obtain a CT image on the corresponding scale; and fuse CT images on the plurality of scales to obtain a reconstructed image of the object to be inspected.

According to an embodiment of the present disclosure, the CT scanning apparatus is configured to perform one of the following: detector under-sampling scanning, sparse-angle scanning, intra-reconstruction scanning, finite angle scanning, and linear trajectory scanning, and the first convolutional neural network is a pooling layer-free convolutional neural network.

According to an embodiment of the present disclosure, the CT scanning apparatus is configured to perform circular scanning or helical scanning, and the first convolutional neural network further comprises a plurality of pooling layers disposed after respective convolutional layers, and a fully connected layer.

According to an embodiment of the present disclosure, the processor is further configured to: process, on each scale, the reconstructed image by using a second convolutional neural network.

According to an embodiment of the present disclosure, the processor is further configured to: locally smooth the reconstructed image by using the second convolutional neural network.

According to an embodiment of the present disclosure, the processor is further configured to convolve the projection data on the first scale with different convolutional kernels to obtain projection data on other scales.

According to an embodiment of the present disclosure, the processor is further configured to: fuse the CT images on the plurality of scales progressively by an up-sampling operation, to finally obtain the reconstructed image of the object to be inspected.

According to yet another aspect of the present disclosure, there is provided a computer-readable medium having computer programs stored thereon, which when being executed by a processor, cause the processor to perform the following steps: generating projection data on a plurality of other scales from projection data on a first scale; processing, on each scale, projection data on the corresponding scale by using a first convolutional neural network to obtain processed projection data, and performing a back-projection operation on the processed projection data to obtain a CT image on the corresponding scale; and fusing CT images on the plurality of scales to obtain a reconstructed image of the object to be inspected.

With the solutions according to the embodiments of the present disclosure described above, a CT image with a higher quality can be reconstructed.

BRIEF DESCRIPTION OF THE ACCOMPANYING DRAWINGS

For better understanding of the present disclosure, the present disclosure will be described in detail with reference to the following accompanying drawings.

DETAILED DESCRIPTION

The specific embodiments of the present disclosure will be described in detail below. It should be noted that the embodiments herein are used for illustration only, without limiting the present disclosure. In the description below, a number of specific details are explained to provide better understanding of the present disclosure. However, it is apparent to those skilled in the art that the present disclosure can be implemented without these specific details. In other instances, well known circuits, materials or methods are not described specifically so as not to obscure the present disclosure.

Throughout the specification, the reference to "one embodiment," "an embodiment," "one example" or "an example" means that the specific features, structures or properties described in conjunction with the embodiment or example are included in at least one embodiment of the present disclosure. Therefore, the phrases "in one embodiment," "in an embodiment," "in one example" or "in an example" occurred in various positions throughout the specification may not necessarily refer to the same embodiment or example. Furthermore, specific features, structures or properties may be combined into one or more embodiments or examples in any appropriate combination and/or sub-combination. Moreover, it should be understood by those skilled in the art that the term "and/or" used herein means any and all combinations of one or more listed items.

For one or more problems in the related art, the embodiments of the present disclosure propose a method and device for reconstructing a CT image and a storage medium. According to the embodiments of the present disclosure, projection data (displayed as a sinogram, with a dimension being a detector pixel sequence, and another dimension being a scanning angle) on a plurality of scales is generated from projection data of an object to be inspected. Then, for projection data on each scale, projection data obtained through CT scanning is processed by using a convolutional neural network to obtain processed projection data (for example, a sinogram with enhanced characteristics in a projection domain). Then, the processed projection data is back-projected on each scale to obtain CT images on various scales. The CT images on various scales are fused to obtain a reconstructed image of the object to be inspected. In this way, the quality of the reconstructed image can be improved, and particularly, a CT image with a higher quality can be reconstructed even in a case that projection data is incomplete due to detector under-sampling, sparse-angle scanning, intra-reconstruction, limited-angle scanning, or linear trajectory scanning, etc. In other embodiments, the CT image may further be processed on each scale by using another convolutional neural network, and the above fusion process may then be performed to obtain a reconstructed image.

Figure 1:
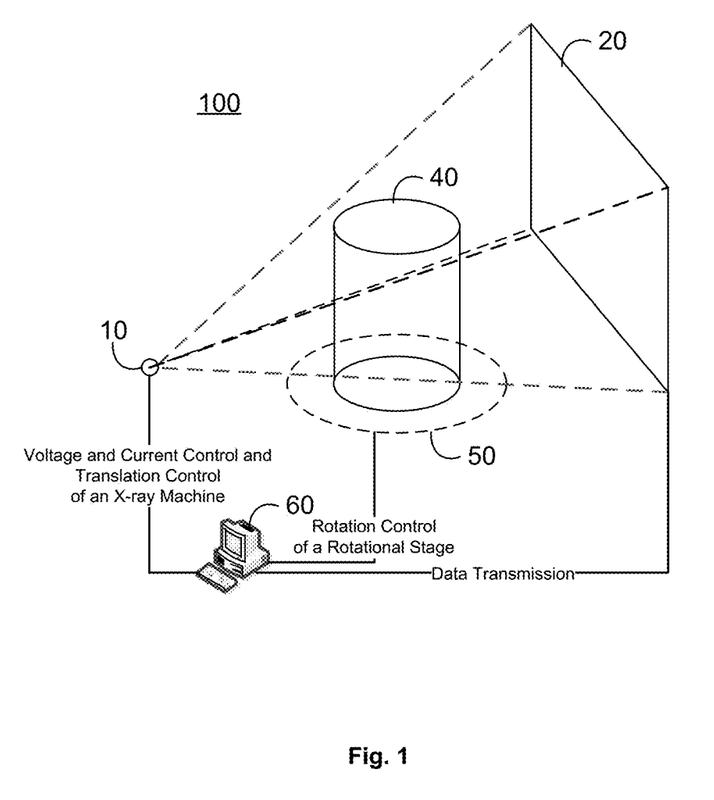
FIG. 1 illustrates a schematic structural diagram of a device for reconstructing a CT image according to an embodiment of the present disclosure.

FIG. 1 illustrates a schematic structural diagram of a device for reconstructing a CT image according to an embodiment of the present disclosure. As shown in FIG. 1, the CT device according to the present embodiment comprises an X-ray source 10, a mechanical movement apparatus 50, a detector and data acquisition system 20, and a control and reconstruction apparatus 60, so as to perform CT scanning and reconstruction on an object 40 to be inspected.

The X-ray source 10 is, for example, an X-ray machine, and an appropriate focus size of the X-ray machine is selected according to a resolution of imaging. In other embodiments, instead of using the X-ray machine, an X-ray beam may be generated by using a linear accelerator.

The mechanical movement apparatus 50 comprises a stage, a rack, a control system, etc. The stage may be translated to adjust a position of a center of rotation. The rack may be translated to align the X-ray source (the X-ray machine) 10, the detector, and the center of rotation. In the present embodiment, the description is made according to a circular scanning trajectory or a spiral trajectory of a rotational stage and a fixed rack. As the movement of the stage with respect to the rack is a relative motion, the method according to the present embodiment may also be implemented by a fixed stage and a rotational rack.

The detector and data acquisition system 20 comprises an X-ray detector, a data acquisition circuit, etc. A solid detector, a gas detector, or other detectors may be used as the X-ray detector; however, the embodiments of the present disclosure are not limited thereto. The data acquisition circuit comprises a readout circuit, an acquisition trigger circuit, a data transmission circuit, etc.

The control and reconstruction apparatus 60 comprises, for example, a computer device installed with a control program and a reconstruction program, and is responsible for performing control of an operation process of the CT system, including mechanical rotation, electrical control, safety interlock control, etc., and reconstructing a CT image from the projection data.

Figure 2:
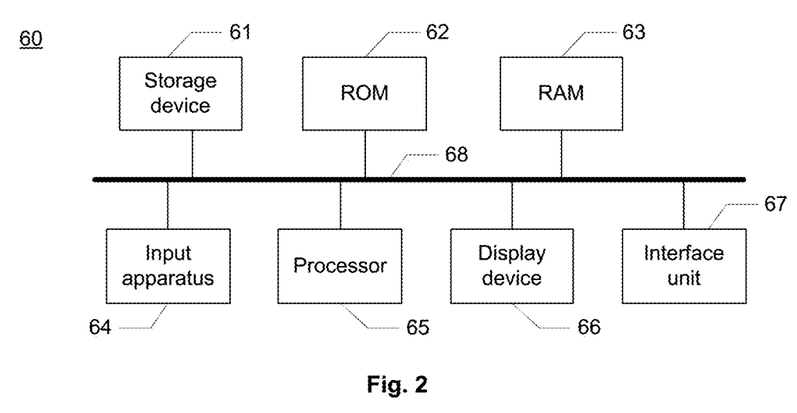
FIG. 2 is a schematic structural diagram of a control and reconstruction apparatus in the device shown in FIG. 1.

FIG. 2 illustrates a schematic structural diagram of the control and reconstruction apparatus shown in FIG. 1. As shown in FIG. 2, data collected by the detector and data acquisition system 20 is stored in a storage device 61 through an interface unit 67 and a bus 68. A Read-Only Memory (ROM) 62 has configuration information and programs of a computer data processor stored therein. A Random Access Memory (RAM) 63 is configured to temporarily store various data during operation of a processor 65. In addition, computer programs for performing data processing, such as a calculation program for reconstructing a CT image etc., are also stored in the storage device 61. The storage device 61, the read-only memory 62, the random access memory 63, an input apparatus 64, the processor 65, a display device 66, and the interface unit 67 are connected through the internal bus 68.

After a user inputs an operation command through the input apparatus 64 such as a keyboard, a mouse, etc., instruction codes of the computer program instruct the processor 65 to execute an algorithm for reconstructing a CT image, and after obtaining a reconstruction result, display the reconstruction result on the display device 66 such as an LCD display, or output a processing result directly in a form of a hard copy such as printing.

Figure 3:
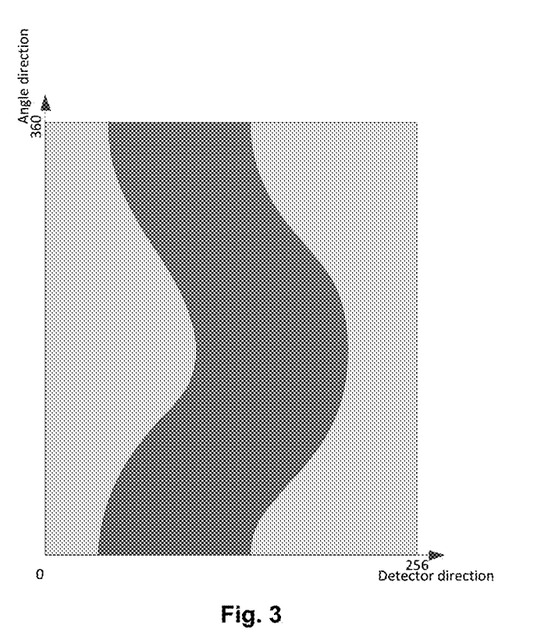
FIG. 3 illustrates an example of a sinogram of projection data obtained by the device according to an embodiment of the present disclosure.

According to an embodiment of the present disclosure, CT scanning is performed on an object to be inspected by using the above device to obtain projection data. Generally, such projection data may be displayed in a form of a two-dimensional image. FIG. 3 illustrates an example of projection data obtained according to an embodiment of the present disclosure. A horizontal axis of the sinogram shown in FIG. 3 represents a detector pixel sequence (for example, from 1 to 256) and a vertical axis of the sinogram shown in FIG. 3 represents an angle (for example, from 1 degree to 360 degrees). The processor 65 in the control device then executes a reconstruction program to generate projection data (displayed as a sinogram, with a dimension being a detector pixel sequence, and another being a scanning angle) on a plurality of scales from the projection data of the object to be inspected. Then, projection data on each scale is processed by using a first convolutional neural network to obtain processed projection data, and a back-projection operation is performed on the processed projection data on each scale to obtain a CT image on the corresponding scale. Finally, CT images on various scales are fused to obtain a reconstructed image of the object to be inspected.

As described above, in the embodiments of the present disclosure, after the scale of the projection data is transformed, projection data on each scale is processed by using a convolutional neural network in a projection domain, then a back-projection operation is performed to reconstruct a CT image on the corresponding scale, and CT images on various scales are fused. The convolutional neural network may comprise convolutional layers, pooling layers, and fully connected layers. The convolutional layers each identify characteristics of an input data set, and each convolutional layer has a nonlinear activation function operation. The characteristics is refined by the pooling layers, and typical operations comprise mean-pooling and max-pooling. One or more fully connected layers implement a high-order signal nonlinear synthesis operation, and the full connected layer also has a nonlinear activation function. The commonly used nonlinear activation functions comprise Sigmoid, Tanh, ReLU. etc.

Figure 4:
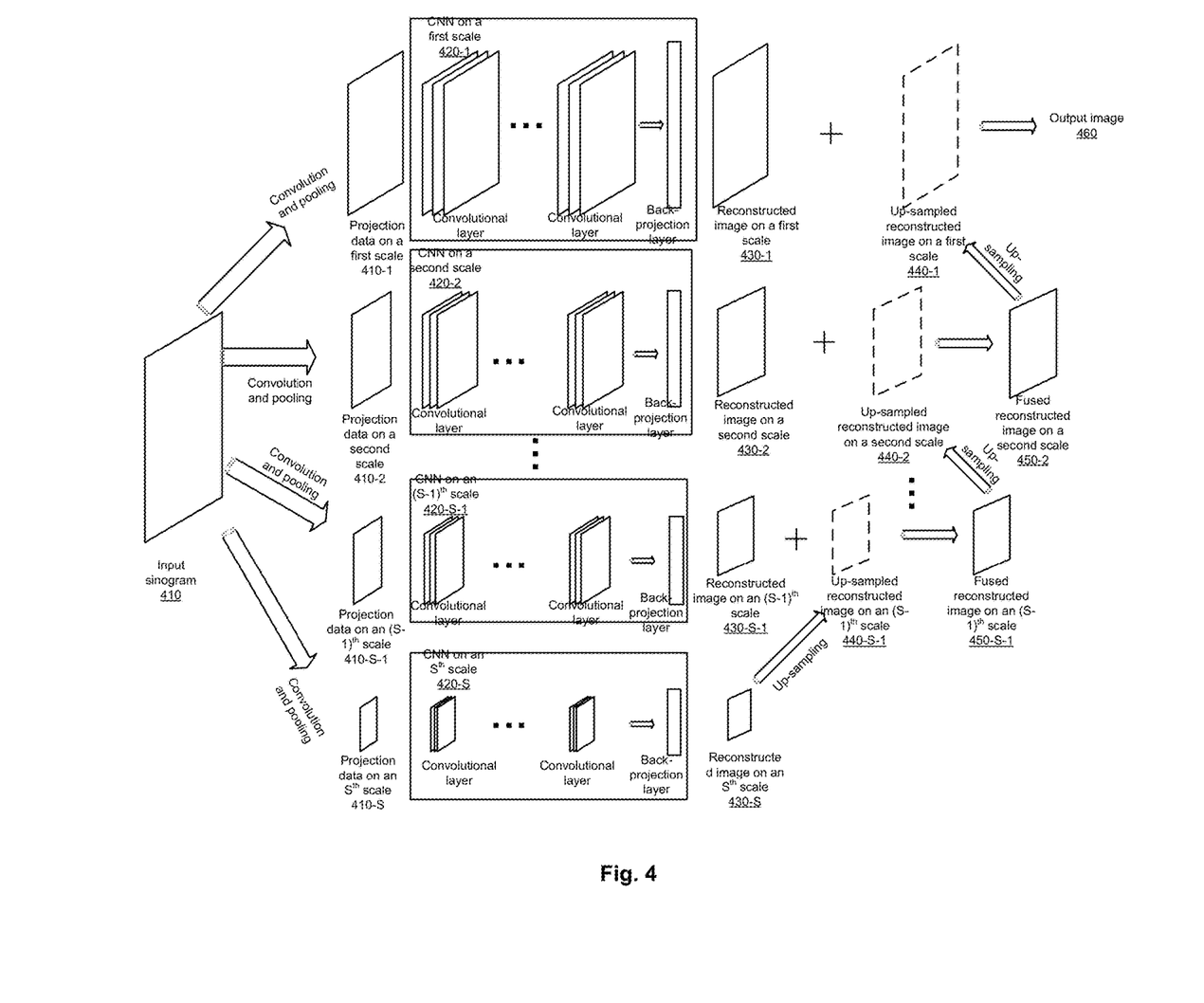
FIG. 4 illustrates a schematic diagram of reconstructing an image using a convolutional neural network in the device according to an embodiment of the present disclosure.

FIG. 4 illustrates a schematic diagram of reconstructing an image using a convolutional neural network in the device according to an embodiment of the present disclosure.

Specifically, 360-degree circular CT scanning is performed on the object 40 to be inspected by using the inspection device shown in FIG. 1, to obtain the projection data of the object 40 to be inspected and display the projection data as a sinogram 410. Then, a plurality of convolutional kernels are used to be convolved with the sinogram 410 respectively, and pooling is performed on different scales on various convolved images (for example, 2, 3, 4, 6, etc. may be selected as a pooling step), to obtain projection data on different scales, specifically, corresponding projection data on S scales which are projection data 410-1 on a first scale, projection data 410-2 on a second scale, ..., projection data 410-S-1 on an $(S-1)^{th}$ scale, and projection data 410-S on an $S^{th}$ scale, as shown in FIG. 4. Then, the projection data on the S scales is convolved using corresponding Convolutional Neural Networks (CNNs), and a back-projection operation is performed to obtain reconstructed images on the corresponding scales.

As shown in FIG. 4, for the projection data 410-1 on the first scale, a convolution operation is performed on the projection data 410-1 on the first scale using a CNN 420-1 on the first scale, and then back projection is performed to obtain a reconstructed image 430-1 on the first scale. Similarly, for the projection data 410-2 on the second scale, a convolution operation is performed on the projection data 410-2 on the first scale using a CNN 420-2 on the second scale, and then back projection is performed to obtain a reconstructed image 430-2 on the second scale. For the projection data 410-S-1 on the $(S-1)^{th}$ scale, a convolution operation is performed on the projection data 410-S-1 on the $(S-1)^{th}$ scale using a CNN 420-S-1 on the $(S-1)^{th}$ scale, and then back projection is performed to obtain a reconstructed image 430-S-1 on the $(S-1)^{th}$ scale. For the projection data 410-S on the $S^{th}$ scale, a convolution operation is performed on the projection data 410-S on the $S^{th}$ scale using a CNN 420-S on the $S^{th}$ scale, and then back projection is performed to obtain a reconstructed image 430-S on the $S^{th}$ scale.

Then, the reconstructed images 430-1, 430-2, ..., 430-S-1 and 430-S are fused. Specifically, as shown in FIG. 4, the reconstructed image 430-S on the $S^{th}$ scale is up-sampled to obtain an up-sampled reconstructed image 440-S-1 on the $(S-1)^{th}$ scale. An integral image formed by the reconstructed image 440-S-1 on the $(S-1)^{th}$ scale and the up-sampled reconstructed image 440-S-1 is convolved on the $(S-1)^{th}$ scale with a convolutional kernel to obtain a fused reconstructed image on the $(S-1)^{th}$ scale. The above up-sampling is an inverse process of pooling. Up-sampling methods comprise, for example, bilinear interpolation, bicubic interpolation, edge information-based interpolation method, etc., and training is not required in the up-sampling process. For example, the reconstructed image 430-S-1 and the up-sampled image 440-S-1 are both images having a scale of L×W, so that they form an L×W×2 image as a whole. In this case, a convolutional kernel having a scale of c×d×2 may be used to be convolved with the L×W×2 image to form a new L×W×1 image.

Next, the fused reconstructed image 450-S-1 on the $(S-1)^{th}$ scale is up-sampled to obtain an up-sampled reconstructed image 440-2 on the second scale. Similarly, the up-sampled reconstructed image 440-2 on the second scale is obtained. An integral image formed by the reconstructed image 430-2 on the second scale and the up-sampled reconstructed image 440-2 is convolved on the second scale with a convolutional kernel to obtain a fused reconstructed image 450-2 on the second scale.

Furthermore, the fused reconstructed image 450-2 on the second scale is up-sampled to obtain a reconstructed image 440-1 on the first scale. An integral image formed by the reconstructed image 430-1 on the first scale and the up-sampled reconstructed image 440-1 is convolved on the first scale with a convolutional kernel to obtain a fused reconstructed image on the first scale, i.e., an output image 440.

In the present disclosure, an up-sampling operation is preferably used to progressively fuse CT images on a plurality of scales to finally obtain the reconstructed image of the object to be inspected. However, the present disclosure is not limited to progressive fusion, let alone progressive fusion from small to large. As long as the output image has the CT image on the maximum scale (maximum resolution) fused therein. For example, by taking scales being 1, 2, ..., S-1 and S from large to small as an examples, CT images on the 2nd, ..., $(S-1)^{th}$ and $S^{th}$ scales may firstly be up-sampled to obtain images on the first scale, and an image formed by an CT image on the first scale with the maximum resolution and the remaining S-1 up-sampled images is convolved with a convolutional kernel in a thickness direction to obtain a fused image.

Figure 5A:
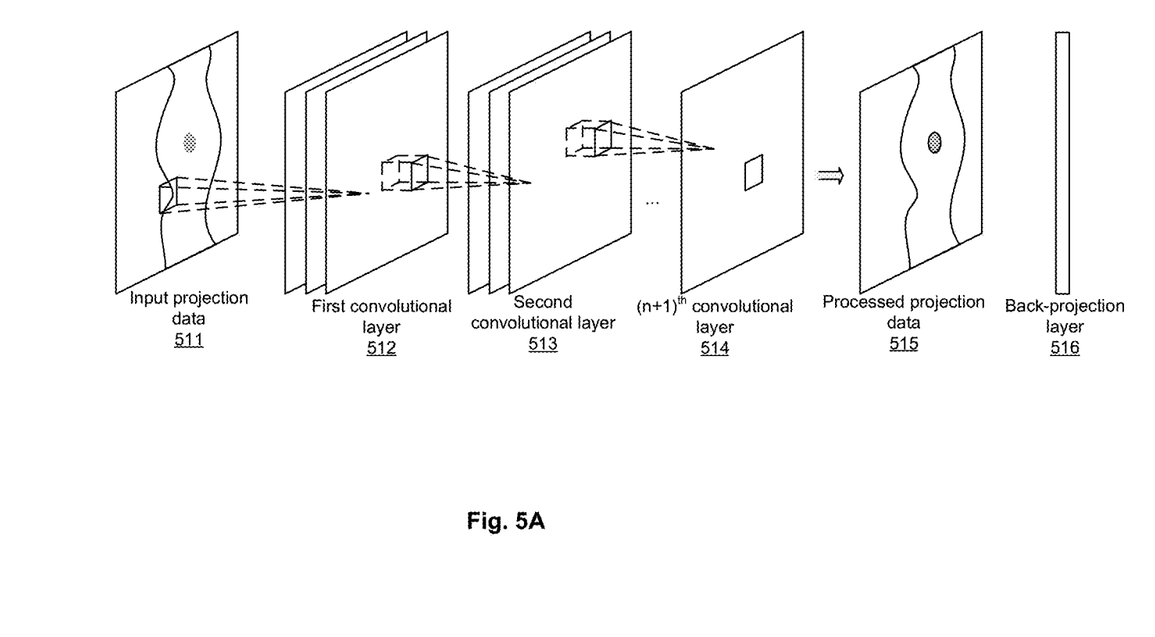
FIG. 5A illustrates a schematic structural diagram of a convolutional neural network used in the device according to an embodiment of the present disclosure.

FIG. 5A illustrates a structural diagram of a convolutional neural network used in the device according to an embodiment of the present disclosure. As shown in FIG. 5A, for example, CNNs such as the CNN 420-1 on the first scale, the CNN 420-2 on the second scale, the CNN 420-S-1 on the $(S-1)^{th}$ scale, and the CNN 420-S on the $S^{th}$ scale shown in FIG. 4 may be formed by stacking different layers and may transform input data into output data. For example, projection data (for example, input projection data 511 shown in FIG. 5A) obtained by CT scanning is processed to obtain processed projection data (for example, processed projection data 515 shown in FIG. 5A).

The convolutional neural network shown in FIG. 5A comprises a plurality of convolutional layers, for example, a first convolutional layer 512, a second convolutional layer 513, ..., an $(n+1)^{th}$ convolutional layer 514, where n is a natural number. These convolutional layers are essential blocks of the CNN. Parameters of each convolutional layer consist of a set of learnable convolutional kernels (or simply called convolutional kernels), each of which has a certain receptive field and extends over the entire depth of the input data. In a forward process, each convolutional kernel is convolved along a width and a height of the input data, a dot product of elements of the convolutional kernel and the input data is calculated, and a two-dimensional activation map of the convolutional kernel is generated. As a result, the network may learn a convolutional kernel which can be activated only when a specific type of characteristics is seen at a certain input spatial position.

Activation maps of all the convolutional kernels are stacked in a depth direction to form all the output data of the convolutional layer. Therefore, each element in the output data may be interpreted as an output of a convolutional kernel which sees a small area in the input and shares parameters with other convolutional kernels in the same activation map.

For example, the input projection data obtained by CT scanning is $g=\{g_1, g_2, L, g_M\}$, and the data in the projection domain after a plurality of preliminary convolution operations and pooling operations have been performed are $g_i$, i=1, 2, ..., S−1, and S respectively. The line integral projection process is $H=\{H_{mn}\}_{M \times N}$, and the output is a reconstructed image f.

Figure 6A:
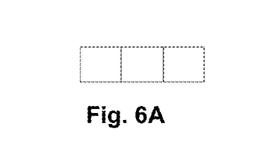
FIGS. 6A, 6B, and 6C illustrate a diagram of sizes of filter cores used in the device according to an embodiment of the present disclosure.
Figure 6B:
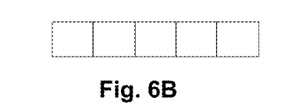
Figure 6C:
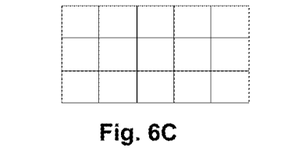

The first convolutional layer 512 implements the following operation: $g_i^{(1)}=g_i \otimes c^{(1)} \equiv (c^{(1)})^T g_i$, where $C^{(1)}$ represents a convolutional kernel, and T represents "transpose." A two-dimensional convolutional kernel on a certain scale has two dimensions, a first one of which is defined as a detector pixel sequence, and a second one of which is defined as a scanning angle here. Lengths of the convolutional kernel in the two dimensions do not need to be the same. Generally, a scale of the convolutional kernel $C^{(1)}$ on the dimension of the detector pixel sequence is set to be greater than a scale of the convolutional kernel $C^{(1)}$ on the dimension of the scanning angle, for example, 3*1, 5*1, and 5*3 convolutional kernels are used, as shown in FIGS. 6A, 6B and 6C. A plurality of convolutional kernels may be set on each scale. A scale of a convolutional kernel of a convolutional layer in a convolutional neural network on the dimension of the detector pixel sequence is set independently from a scale of the convolutional kernel of the convolutional layer in the convolutional neural network on the dimension of the scanning angle. The convolutional layer has an activation function $\varphi(g_i^{(1)})$, where i=1, 2, ..., S−1, S. $K^{(1)}$ is defined as a thickness of this layer, i.e. a number of convolutional kernels. $K^{(1)}$ new sinograms are formed for this layer. In FIG. 4, a thickness of the first convolutional layer 512 is 3 (i.e., the first convolutional layer 420 has 3 convolutional kernels), wherein all the convolutional kernels are network parameters to be determined. These network parameters are obtained by training the convolutional neural network. The thickness of 3 in FIG. 5A is merely an example, and the present disclosure is not limited thereto. By taking the reconstruction of two-dimensional parallel beam CT scanning as an example, 24 convolutional kernels may be set for one convolutional layer, so that 24 sinograms are obtained for a first layer of the network. ReLU is selected as the activation function. ReLU is an abbreviation for a Rectified Linear Unit. This is a neuron layer in which a non-saturated activation function f(x)=max(0,x) is applied. A decision function and non-linear characteristics of the entire network are added without affecting the receptive field of the convolutional layer.

A plurality of convolutional layers similar to the first convolutional layer may be set, with a thickness of each convolutional layer being $K^{(n)}$.

The second convolutional layer 513 is similar to the first convolutional layer 512, and a thickness of the second convolutional layer is $K^{(2)}$. For example, a sinogram output by a previous convolutional layer is further processed by using $C^{(n)}$. As shown in FIG. 4, the thickness of the second convolutional layer 513 is 3, wherein all the convolutional kernels are network parameters to be determined. These network parameters are obtained by training the convolutional neural network. The above-mentioned 3 is merely an example. Similarly, 24 convolutional kernels may be set for one convolutional layer, so that 24 sinograms are obtained for the second convolutional layer (a second layer of the network). Here, ReLu is selected as the activation function. In another embodiment, a convolution operation is performed in a thickness direction in the second convolutional layer by using a convolutional kernel having a shape/size parameter of 18*1*1 to obtain an output of the second layer, with ReLu being the activation function.

The $(n+1)^{th}$ convolutional layer 514 may be, for example, an $(n+1)^{th}$ layer of the network, specifically an $(n+1)^{th}$ convolutional layer, and there may be or may not be another convolutional layer between the second convolutional layer 513 and the $(n+1)^{th}$ convolutional layer 514. The $(n+1)^{th}$ convolutional layer 514 implements the following operation: $g_i^{(n+1)}=g_i^{(n)} \otimes c^{(n+1)} \equiv^T g_i^{(n)}$, where $C^{(n+1)}$ represents a convolutional kernel and T represents "transpose." A convolutional kernel of the $(n+1)^{th}$ convolutional layer has a shape/size parameter of $K^{(n+1)} \times 1 \times 1$, a thickness of $K^{(n+1)}$, and a length and a width each being 1. A sinogram output by a previous convolutional layer is further processed, to obtain the processed projection data (shown as a sinogram). This convolutional layer also has an activation function $\varphi(g_i^{n+1})$.

The convolutional neural network as shown in FIG. 5A further comprises a back-projection layer 516. The back-projection layer 516 is, for example, an $(n+2)^{th}$ layer of the convolutional neural network and implements the following operation: $f^{n+2}=H^T g_i^{n+1}$, i.e., performing a CT back-projection operation, and weight coefficients between network nodes are determined by a geometric relationship of the CT scanning device. There are no parameters to be determined for this layer. As another manner, a projection matrix H may be determined based on the geometric relationship of the CT scanning device, and a back-projection operation may be performed on the processed sinogram to obtain a reconstructed CT image. For example, the projection matrix is calculated by using an Siddon method, and elements of the system matrix correspond to connection weights of a back-projection connection layer.

Figure 5B:
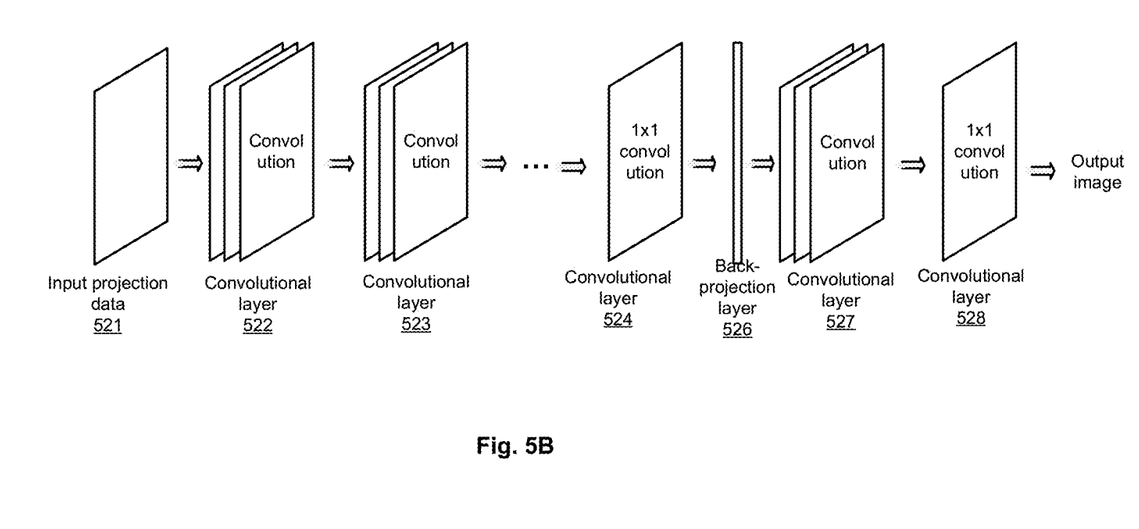
FIG. 5B illustrates a schematic structural diagram of another convolutional network used in the device according to an embodiment of the present disclosure.

FIG. 5B illustrates a schematic structural diagram of another convolutional network used in the device according to an embodiment of the present disclosure. As shown in FIG. 5B, an input projection data 521, a convolutional layer 522, a convolutional layer 523, and a convolutional layer 524 are similar to the input projection data 511, the first convolutional layer 512, the second convolutional layer 513 and the $(n+1)^{th}$ convolutional layer 514 shown in FIG. 5A, and will not be repeated here. The structure shown in FIG. 5B differs from that shown in FIG. 5A in that in the structure shown in FIG. 5B, a second convolutional neural network is further provided, which comprises an image domain initial convolutional layer (one convolutional layer 527 is shown in FIG. 5B as an example, but the present disclosure is not limited thereto) and an end convolutional layer (a convolutional layer 528), and the reconstructed CT image is processed in the image domain, for example, is locally smoothed, to output the resultant image.

For example, if the image domain initial convolutional layer comprises only one convolutional layer 527, the convolutional layer 527 described above may be represented as $f^{(n')}=(C^{(n')})^T f^{(n-2)}$. If the image domain initial convolutional layer comprises a plurality of convolutional layers, a convolutional layer following a first convolutional layer in the image domain initial convolutional layer may be represented as $f^{(n+1')}=(C^{(n+1')})^T f^{(n')}$, where $f^{(n')}$ is an output of a previous convolutional layer. Each of these convolutional layers in the image domain initial convolutional layer has an activation function $\varphi(f^{(k)})$. The output of the image domain initial convolutional layer is input to the convolutional layer 528.

The convolutional layer 528 is a last but one layer of the network, and the convolutional layer 528 implements the following operation: $f^{(*)}=f^{(*-1)}\otimes c^{(*)}\equiv(C^{(*)})^T f^{(*-1)}$, where $f^{(*-1)}$ is an output of a previous convolutional layer ($f^{(*-1)}$ is $f(n')$ in a case that the image domain initial convolutional layer only comprises one convolutional layer 527), with a shape/size parameter of the convolutional kernel being $K^{(*-1)} \times 1 \times 1$, so as to obtain the resultant image. Here, $K^{(*-1)}$ is a number of convolutional kernels of the previous convolutional layer. That is, convolution occurs in the thickness direction. This convolutional layer has no activation function.

Although no pooling layer is included in the above structure, there may be a pooling layer in the above structure. For example, in a case that complete data is obtained by CT scanning (for example, full detector 360-degree circular scanning), a pooling layer may be provided after one or more convolutional layers. However, in a case that incomplete data is obtained by CT scanning (for example, detector under-sampling, sparse-angle sampling, limited-angle, intra-reconstruction, or linear trajectory, etc.), no pooling layer is provided.

In addition, according to an embodiment of the present disclosure, the second convolutional neural network further comprises an output layer which is at the last layer of the network, and the output layer outputs the resultant image. For the resultant image output by the output layer, a cost function is defined as $\Phi(f)=\frac{1}{2}(f-f^*)^T W(f-f^*)$, where $f=\{f_1, f_2, L, f_n\}$ is the output resultant image, $f^*$ is a target image, and W is a diagonal matrix for controlling weights. The parameters of the first convolutional neural network and the second convolutional neural network are updated by making the cost function toward zero. In a case that the second convolutional neural network is not provided, the reconstructed image output by the first convolutional neural network is taken as the resultant image, and the parameters of the first convolutional neural network are updated based on the above cost function.

In addition, ramp convolution may further be performed on a sinogram (for example, the sinogram 410 shown in FIG. 4) obtained by performing CT scanning by using an RL ramp filter. It can be understood by those skilled in the art that other activation functions may also be used. For example, in some other embodiments, other functions, such as a hyperbolic tangent function $f(x)=\tan h(x)$ and a Sigmoid function $f(x)=(1+e^{-x})^{-1}$, may also be used to increase the nonlinearity. Compared with other functions, the ReLU function is more commonly used as it allows a neural network to be trained several times faster without having a significant impact on the accuracy.

Methods such as a random gradient descent method, a momentum update method, Nesterov Momentum, AdaGrad, Adam, etc. may be used to update network parameters. For example, back-propagation of an error is as follows:

a) A gradient of an output layer is $$\frac{\partial \Phi(f)}{\partial f} = (f - f^*)^T W,$$

b) Error propagation of a back-projection layer is $$\frac{\partial f^{(4)}}{\partial g_i} = H^T,$$

c) Error propagation of a convolution operation of a convolutional layer is $$\frac{\partial g_i^{(n)}}{\partial g_i^{(n-1)}} = [C]^T,$$

d) Error propagation of an activation function in each layer is $\varphi'(\bullet)$, wherein, by taking $\varphi(x)=\max(0, x)$ as an example, $\varphi'(x)=u(x)$, which is a step function,
e) Update of network parameters using a stochastic gradient descent method, a momentum update method, Nesterov Momentum, AdaGrad, Adam, etc.,
f) Training using simulation data, and
g) Training using actual scanning data.

Specifically, after the convolutional neural network is established as above, network parameters are trained. For example, a basic mathematical model of a scanned object is established and CT simulation data is generated by modeling an actual system. In addition, according to an embodiment of the present disclosure, CT simulation data of a plurality of scanned objects may further be used as an input of the network, and an image true value of the scanned objects is used as a marker, to train the network parameters. In other embodiments, the object is also scanned on the actual system, to obtain CT scanning data, which is input to the network for reconstruction and testing. Targeted image processing is performed on a test result, for example, known local smooth regions are locally smoothed. The network is further trained by using the processed image as a marker to achieve fine tuning of the network parameters.

Figure 7:
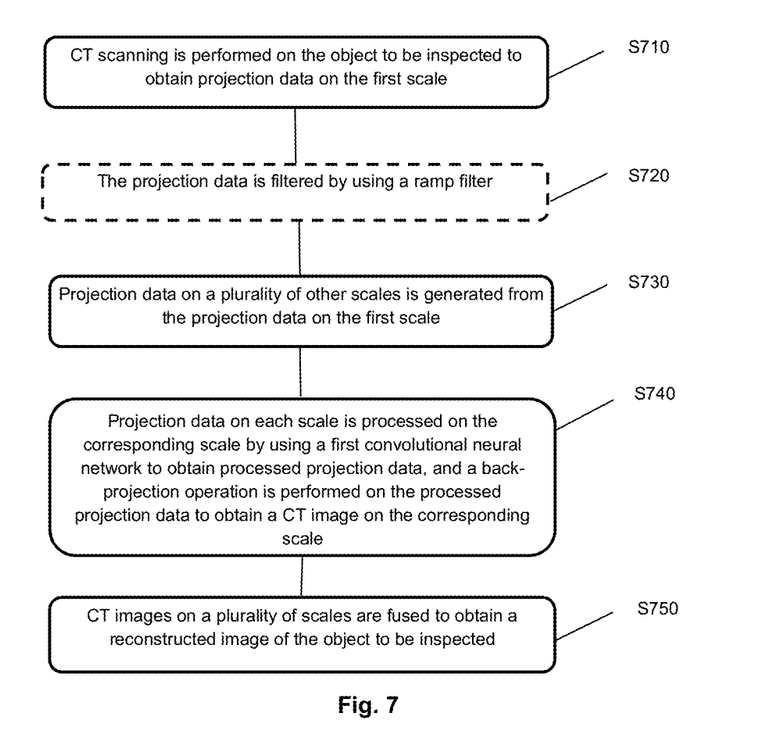
FIG. 7 is a schematic flowchart illustrating a method according to an embodiment of the present disclosure.

FIG. 7 is a schematic flowchart illustrating a method according to an embodiment of the present disclosure. As shown in FIG. 7, in step S710, CT scanning is performed on the object to be inspected to obtain projection data on the first scale. The CT scanning here may be mono-energy scanning or multi-energy scanning, and the embodiments of the present disclosure are not limited thereto.

In step S720, the projection data on the first scale is filtered by using a ramp filter. For example, the projection data is filtered by using an RL ramp filter. It can be understood by those skilled in the art that other filters may be used here or filtering is not performed.

In step S730, projection data on a plurality of other scales is generated from the projection data on the first scale. For example, original projection data (shown as the sinogram 410) is convolved with convolutional kernels on different scales to obtain projection data on different scales.

In step S740, projection data on each scale is processed on the corresponding scale by using a first convolutional neural network to obtain processed projection data, and a back-projection operation is performed on the processed projection data to obtain a CT image on the corresponding scale. For example, the projection data on each scale is processed in a projection domain by using a convolutional neural network (for example, 512, 513, or 514), to obtain processed projection data on each scale. For example, the projection data is processed by using a convolutional neural network obtained by training to obtain a processed sinogram, as shown in FIG. 5A. Then, a back-projection operation is performed on the processed projection data on each scale. For example, a back-projection operation is performed in the back-projection layer 516 shown in FIG. 5A to obtain a CT image on a corresponding scale.

As described above, as another embodiment, post-processing may be performed on the CT image after the CT image is obtained, for example, the reconstructed CT image is processed by using the second convolutional neural network 527/528 to obtain the resultant image on this scale. For example, the reconstructed image is locally smoothed or other image processing operations such as segmentation, edge enhancement, and equalization, etc. may be performed on the reconstructed image.

In step S750, CT images on a plurality of scales are fused through up-sampling and convolution in the thickness direction to obtain a reconstructed image of the object to be inspected.

Although the above description is mainly described in a case that 360-degree circular scanning is performed to obtain complete projection data, it can be understood by those skilled in the art that the above solution can be applied to the case of incomplete projection data due to, for example, detector under-sampling, sparse-angle sampling, limited-angle, intra-reconstruction, or linear trajectory scanning, etc.

Figure 8:
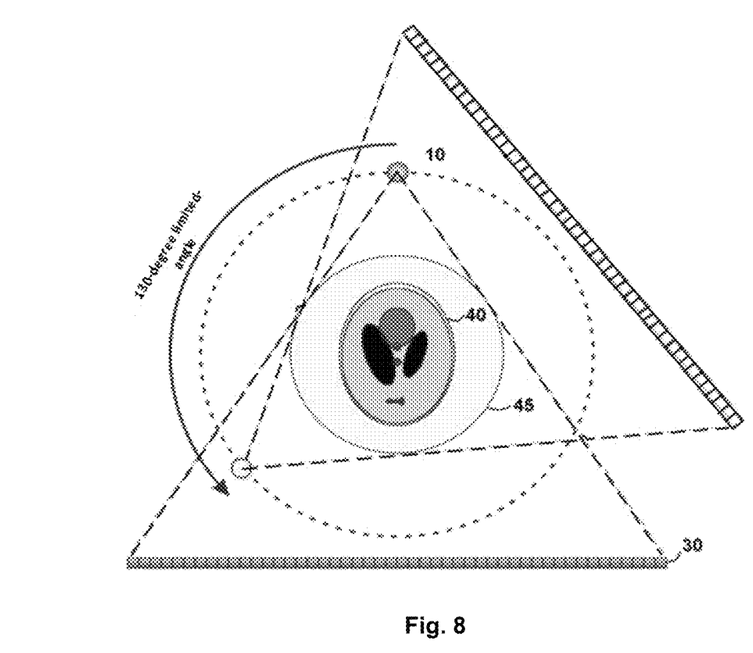
FIG. 8 is a schematic diagram of a scanning apparatus which implements limited-angle CT scanning according to another embodiment of the present disclosure.

FIG. 8 is a schematic diagram of a scanning apparatus which implements limited-angle CT scanning according to another embodiment of the present disclosure. As shown in FIG. 8, after X rays emitted by the radiation source 10 pass through the object 40 to be inspected in a field of view 45, the X rays are received by the detector 30, converted into electrical signals, further converted into digital signals indicating attenuation values, and reconstructed in a computer as projection data. With the solutions described above, an image with a higher quality can be reconstructed even if limited-angle (for example, 130-degree) CT scanning is performed on the object 40 to be inspected.

Figure 9:
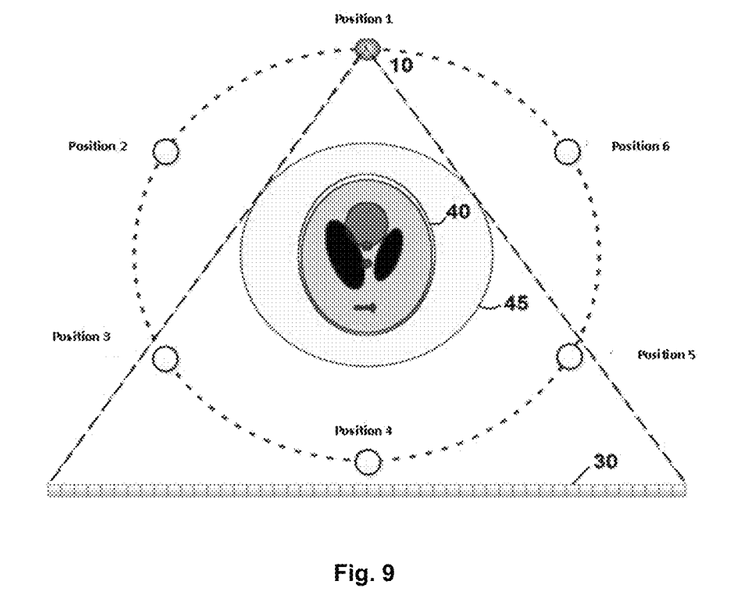
FIG. 9 is a schematic diagram of a scanning apparatus which implements a sparse-angle sampling scanning method according to yet another embodiment of the present disclosure.

FIG. 9 is a schematic diagram of a scanning apparatus which implements a sparse-angle sampling scanning method according to yet another embodiment of the present disclosure. As shown in FIG. 9, after X rays emitted by the radiation source 10 pass through the object 40 to be inspected in a field of view 45, the X rays are received by the detector 30, converted into electrical signals, further converted into digital signals indicating attenuation values, and reconstructed in a compute as projection data r. With the solutions described above, an image with a higher quality can be reconstructed even if CT scanning at a number of rotation positions (for example, six positions) is performed on the object 40 to be inspected. In this way, an image with a higher quality can be reconstructed from the incomplete projection data even if spare-angle CT scanning is performed on the object to be inspected.

Figure 10:
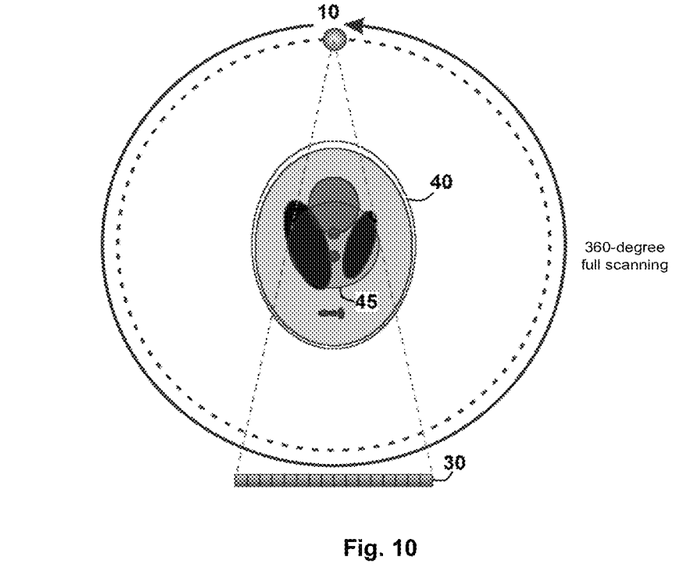
FIG. 10 is a schematic diagram of a scanning apparatus which implements an intra-reconstruction scanning method according to yet another embodiment of the present disclosure.

FIG. 10 is a schematic diagram of a scanning apparatus which implements an intra-reconstruction scanning method according to yet another embodiment of the present disclosure. As shown in FIG. 10, after X rays emitted by the radiation source 10 pass through a part of the object 40 to be inspected in a field of view 45, the X rays are received by the detector 30, converted into electrical signals, further converted into digital signals indicating attenuation values, and reconstructed in a computer as projection data. With the solutions described above, an image with a higher quality can be reconstructed even if intra-reconstruction CT scanning is performed on the object 40 to be inspected.

Figure 11:
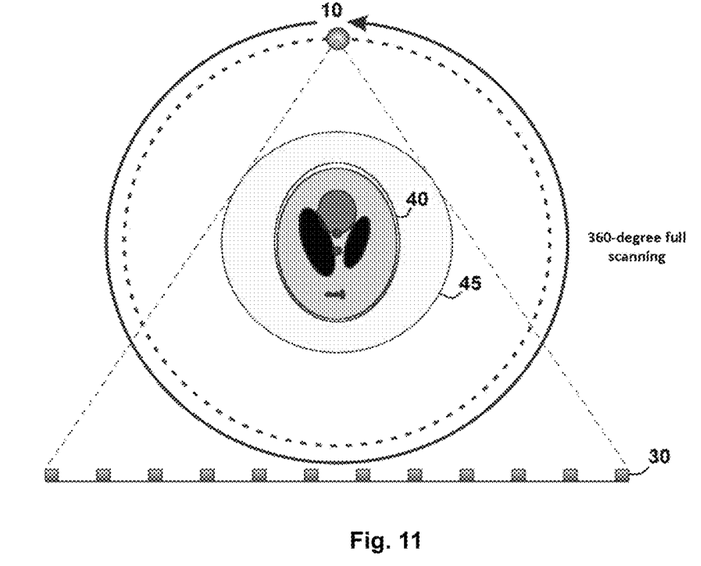
FIG. 11 is a schematic diagram of a scanning apparatus which implements a detector under-sampling scanning method according to yet another embodiment of the present disclosure.

FIG. 11 is a schematic diagram of a scanning apparatus which implements a detector under-sampling scanning method according to yet another embodiment of the present disclosure. As shown in FIG. 11, after X rays emitted by the radiation source 10 pass through the object 40 to be inspected in a field of view 45, the X rays are received by the detector 30, converted into electrical signals, further converted into digital signals indicating attenuation values, and reconstructed in a computer as projection data. In this example, the detector 30 is set to be in an under-sampled form, for example, under-sampling is realized by spacing various detector units apart by a predetermined distance. In this way, with the solutions described above, an image with a higher quality can be reconstructed even if detector under-sampling CT scanning is performed on the object 40 to be inspected.

Figure 12:
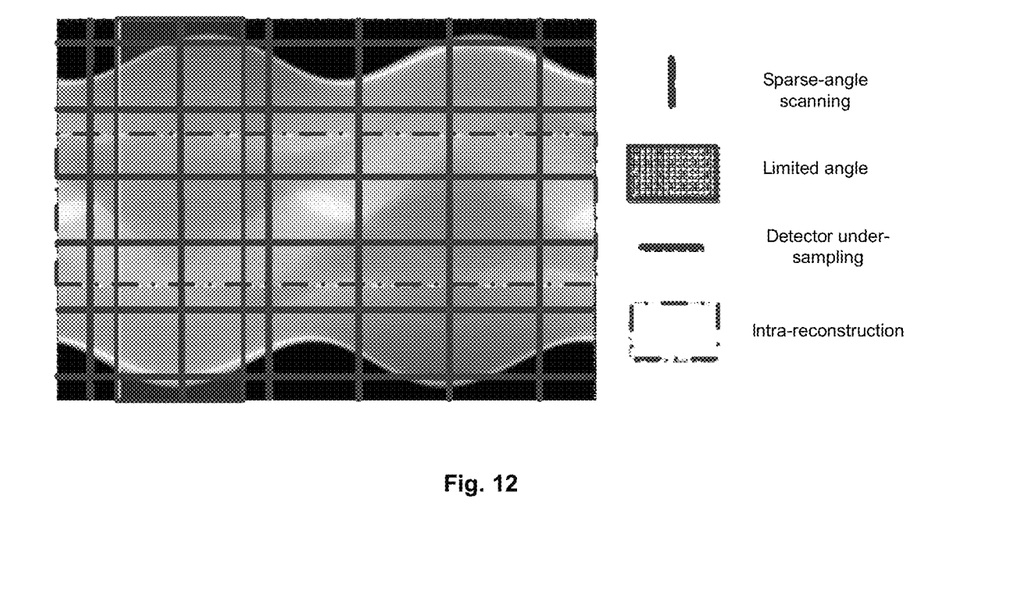
FIG. 12 illustrates a schematic diagram of data contained in sinograms in the different scanning modes shown in FIGS. 8, 9, 10, and 11.

FIG. 12 is a schematic diagram illustrating incomplete projection data involved in the scanning modes shown in FIGS. 8, 9, 10, and 11. As shown in FIG. 12, the projection data obtained by sparse-angle sampling CT scanning, limited-angle CT scanning, detector under-sampling CT scanning, and intra-reconstruction CT scanning are all incomplete. Although the projection data is incomplete, with the above solutions, an image with a higher quality can be reconstructed from the incomplete projection data.

Figure 13:
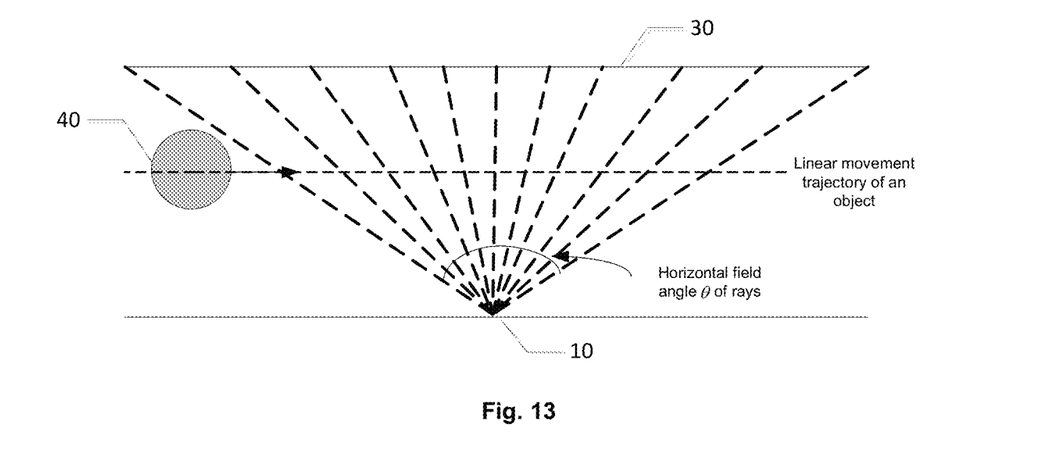
FIG. 13 illustrates a schematic diagram of a scanning apparatus which implements linear trajectory CT scanning according to yet another embodiment of the present disclosure.

Although methods such as sparse-angle sampling scanning are given above, it can be reached by those skilled in the art that the method according to the present disclosure may also be used in a linear trajectory CT scanning system. FIG. 13 illustrates a schematic diagram of a scanning apparatus which implements linear trajectory CT scanning according to yet another embodiment of the present disclosure.

As shown in FIG. 13, after X rays emitted by the radiation source 10 pass through the object 40 to be inspected in a field of view, the X rays are received by the detector 30, converted into electrical signals, further converted into digital signals indicating attenuation values, and reconstructed in a computer as projection data. In this example, the object 40 to be inspected moves along a linear trajectory on a conveyor belt parallel to the detectors. A field angle of the ray source formed by the detectors in a horizontal direction is as large as possible, and the detectors cover the object in a vertical direction. For example, the detector array is placed on an opposite side of the source, and a horizontal field angle θ of the rays is required to be more than 90 degrees, to obtain protection data through the linear trajectory CT scanning. With the solutions described above, an image with a higher quality can be reconstructed even if linear trajectory CT scanning is performed on the object 40 to be inspected.

The embodiments of the present disclosure provide an X-ray CT reconstruction method based on a convolutional neural network to deeply mine data information, form a convolutional neural network and system-specific parameters, and obtain an efficient CT image reconstruction method.

The method according to the present disclosure can be flexibly applied to different CT scanning modes and system architectures and can be used in the fields of medical diagnosis, industrial non-destructive detection and security inspection.

The foregoing detailed description has set forth various embodiments of the method and device for reconstructing a CT image via the use of diagrams, flowcharts, and/or examples. In a case that such diagrams, flowcharts, and/or examples contain one or more functions and/or operations, it will be understood by those skilled in the art that each function and/or operation within such diagrams, flowcharts or examples may be implemented, individually and/or collectively, by a wide range of structures, hardware, software, firmware, or virtually any combination thereof. In one embodiment, several portions of the subject matter described in the embodiments of the present disclosure may be implemented via Application Specific Integrated Circuits (ASICs), Field Programmable Gate Arrays (FPGAs), Digital Signal Processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of those skilled in the art in ray of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

While the present disclosure has been described with reference to several typical embodiments, it is apparent to those skilled in the art that the terms are used for illustration and explanation purpose and not for limitation. The present disclosure may be practiced in various forms without departing from the spirit or essence of the present disclosure. It should be understood that the embodiments are not limited to any of the foregoing details, and shall be interpreted broadly within the spirit and scope as defined by the following claims. Therefore, all of modifications and alternatives falling within the scope of the claims or equivalents thereof are to be encompassed by the claims as attached.

We claim:

1. A method for reconstructing a Computed Tomography (CT) image, comprising:
performing CT scanning on an object to be inspected to obtain projection data on a first scale;
generating projection data on a plurality of other scales from the projection data on the first scale;
processing, on each scale, projection data on the corresponding scale by using a first convolutional neural network to obtain processed projection data, and performing a back-projection operation on the processed projection data to obtain a CT image on the corresponding scale; and
fusing CT images on the plurality of scales to obtain a reconstructed image of the object to be inspected.

2. The method according to claim 1, wherein the CT scanning is one of the following: detector under-sampling scanning, sparse-angle scanning, intra-reconstruction scanning, finite angle scanning, and linear trajectory scanning, and the first convolutional neural network is a pooling layer-free convolutional neural network;
optionally, the CT scanning is circular scanning or helical scanning, and the first convolutional neural network further comprises a plurality of pooling layers disposed after respective convolutional layers, and a fully connected layer.

3. The method according to claim 1, further comprising a step of:
processing, on each scale, a CT image on the corresponding scale by using a second convolutional neural network; and
before generating the projection data on the plurality of other scales, filtering the projection data by using a ramp filter.

4. The method according to claim 3, wherein the CT image on each scale is locally smoothed by using the second convolutional neural network.

5. The method according to claim 1, wherein a convolutional kernel of a convolutional layer in the first convolutional neural network has a dimension of a detector pixel sequence and another of a scanning angle, and a scale of the convolutional kernel of the convolutional layer in the first convolutional neural network on the dimension of the detector pixel sequence is set independently from a scale of the convolutional kernel of the convolutional layer in the first convolutional neural network on the dimension of the scanning angle.

6. The method according to claim 1, wherein the first convolutional neural network comprises at least three convolutional layers, each of which has an activation function for performing a non-linear operation on projection data processed by the convolutional layer.

7. The method according to claim 1, wherein the first convolutional neural network further comprises a back-projection layer for performing a back-projection operation on projection data processed by the convolutional layer; and
wherein a length-width size parameter of a convolutional kernel of a convolutional layer in the first convolutional neural network which is closest to the back-projection layer is 1*1.

8. The method according to claim 3, wherein the second convolutional neural network comprises an image domain initial convolutional layer and an end convolutional layer for processing the reconstructed image in an image domain; and
wherein each convolutional layer included in the image domain initial convolutional layer has an activation function, and the end convolutional layer has no activation function.

9. The method according to claim 1, wherein a plurality of convolutional kernels are convolved with the projection data on the first scale respectively to obtain the projection data on the plurality of other scales; and
wherein pooling is performed on different scales on the projection data on the plurality of other scales to obtain projection data on the plurality of different scales.

10. The method according to claim 1, wherein the step of fusing CT images on the plurality of scales comprises fusing the CT images on the plurality of scales progressively by an up-sampling operation, to finally obtain the reconstructed image of the object to be inspected.

11. The method according to claim 10, wherein the step of fusing the CT images on the plurality of scales progressively comprises fusing the CT images from the smallest scale to the largest scale progressively, wherein a process of fusion in each level comprises:

in a case where a second scale is the smallest scale, performing an up-sampling operation on a CT image on the second scale to obtain a CT image on the first scale which is relatively larger, or in a case where the second scale is not the smallest scale, performing the up-sampling operation on a fused image on the second scale which is relatively smaller to obtain a CT image on the first scale which is relatively larger; and convolving an integral image formed of the reconstructed CT image on the first scale and the CT image obtained after the up-scaling operation with a particular convolutional kernel to obtain a fused image on the first scale.

12. The method according to claim 11, further comprising:

outputting a fused image on the largest scale as a final CT image.

13. The method according to claim 1, wherein the step of fusing CT images on the plurality of scales comprises:

converting CT images on scales other than the largest scale into images on the largest scale by the up-sampling operation; and processing the CT image on the largest scale and the converted images on the largest scale as a whole by using a convolutional kernel to obtain a fused image.

14. A device for reconstructing a Computed Tomography (CT) image, comprising:

a CT scanning apparatus configured to perform CT scanning on an object to be inspected to obtain projection data;

a processor configured to:

generate projection data on a plurality of other scales from the projection data on the first scale;

process, on each scale, projection data on the corresponding scale by using a first convolutional neural network to obtain processed projection data, and perform a back-projection operation on the processed projection data to obtain a CT image on the corresponding scale; and fuse CT images on the plurality of scales to obtain a reconstructed image of the object to be inspected.

15. The device according to claim 14, wherein the CT scanning apparatus is configured to perform one of the following: detector under-sampling scanning, sparse-angle scanning, intra-reconstruction scanning, finite angle scanning, and linear trajectory scanning, and the first convolutional neural network is a pooling layer-free convolutional neural network; or wherein the CT scanning apparatus is configured to perform circular scanning or helical scanning, and the first convolutional neural network further comprises a plurality of pooling layers disposed after respective convolutional layers, and a fully connected layer.

16. The device according to claim 15, wherein the processor is further configured to:

process, on each scale, the reconstructed image by using a second convolutional neural network.

17. The device according to claim 14, wherein the processor is further configured to:

locally smooth the reconstructed image by using the second convolutional neural network.

18. The device according to claim 14, wherein the processor is further configured to convolve the projection data on the first scale with different convolutional kernels to obtain projection data on other scales.

19. The device according to claim 14, wherein the processor is further configured to:

fuse the CT images on the plurality of scales progressively by an up-sampling operation, to finally obtain the reconstructed image of the object to be inspected.

20. A non-transitory computer-readable medium having computer programs stored thereon, which when being executed by a processor, cause the processor to perform the following steps:

generating projection data on a plurality of other scales from projection data on a first scale;

processing, on each scale, projection data on the corresponding scale by using a first convolutional neural network to obtain processed projection data, and performing a back-projection operation on the processed projection data to obtain a CT image on the corresponding scale; and fusing CT images on the plurality of scales to obtain a reconstructed image of the object to be inspected.

* * * * *